United States Patent
Tsoutsaios

(10) Patent No.: US 11,489,890 B2
(45) Date of Patent: Nov. 1, 2022

(54) COMPUTER-IMPLEMENTED METHOD OF SHARING A SCREEN, MEDIA SERVER, AND APPLICATION FOR CONTROLLING A REAL-TIME COMMUNICATION AND COLLABORATION SESSION

(71) Applicant: Unify Patente GmbH & Co. KG, Munich (DE)

(72) Inventor: Antonios Tsoutsaios, Athens (GR)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 17/355,235

(22) Filed: Jun. 23, 2021

(65) Prior Publication Data

US 2021/0409463 A1    Dec. 30, 2021

(30) Foreign Application Priority Data

Jun. 24, 2020  (EP) .................................... 20182051

(51) Int. Cl.
| | | |
|---|---|---|
| *H04L 12/00* | (2006.01) | |
| *H04L 65/401* | (2022.01) | |
| *G06F 3/04842* | (2022.01) | |
| *G06F 3/14* | (2006.01) | |
| *H04L 65/403* | (2022.01) | |

(52) U.S. Cl.
CPC ...... *H04L 65/4015* (2013.01); *G06F 3/04842* (2013.01); *G06F 3/1454* (2013.01); *H04L 65/403* (2013.01)

(58) Field of Classification Search
CPC .. H04L 65/4015; H04L 65/403; H04M 3/567; H04M 7/0027; H04N 7/14; G06F 3/04842; G06F 3/1454
USPC .................................. 709/231, 232, 236, 237
See application file for complete search history.

(56) References Cited

U.S. PATENT DOCUMENTS

| | | | | |
|---|---|---|---|---|
| 8,300,785 | B2 * | 10/2012 | White | H04N 7/144 |
| | | | | 379/93.21 |
| 8,484,292 | B2 * | 7/2013 | Spataro | G06Q 10/107 |
| | | | | 709/205 |
| 9,197,427 | B2 * | 11/2015 | Chazin | H04L 12/1822 |
| 9,204,096 | B2 * | 12/2015 | Baldino | H04N 7/15 |
| 9,204,099 | B2 * | 12/2015 | Brown | H04N 7/152 |
| 9,232,191 | B2 * | 1/2016 | Periyannan | H04N 7/152 |

(Continued)

FOREIGN PATENT DOCUMENTS

| | | | | |
|---|---|---|---|---|
| EP | 3800599 A1 * | 4/2021 | | G06Q 10/10 |
| EP | 3832570 A1 * | 6/2021 | | G06Q 10/10 |

*Primary Examiner* — Frantz Coby

(74) *Attorney, Agent, or Firm* — Buchanan Ingersoll & Rooney PC

(57) ABSTRACT

A computer-implemented method of sharing a screen amongst at least two users participating in a real-time communication and collaboration session via a communication network can be configured so that a screen displaying a first content can be shared by a user of a first client so as to be displayed at at least a second client used by a second user. Embodiments of the method can include receiving, at a control unit for controlling the communication and collaboration session, coordinates specifying the position of an intended item of the first content of the shared screen and receiving, at the control unit, a screenshot of the intended item and a predetermined surrounding area as a sample picture or as sample pixels.

15 Claims, 10 Drawing Sheets

(56) References Cited

U.S. PATENT DOCUMENTS

| | | | | |
|---|---|---|---|---|
| 9,300,705 | B2* | 3/2016 | Periyannan | H04N 7/152 |
| 9,369,673 | B2* | 6/2016 | Ma | H04N 7/141 |
| 9,565,249 | B2* | 2/2017 | Pegg | H04L 67/1091 |
| 9,781,385 | B2* | 10/2017 | Ma | H04N 7/15 |
| 9,848,169 | B2* | 12/2017 | McNelley | G09G 3/002 |
| 9,917,868 | B2* | 3/2018 | Ahmed | H04L 65/403 |
| 9,992,241 | B1* | 6/2018 | Huang | H04L 65/401 |
| 10,298,630 | B2* | 5/2019 | Lo | G06Q 10/101 |
| 10,579,243 | B2* | 3/2020 | Bennett | H04N 7/152 |
| 10,817,572 | B2* | 10/2020 | Spataro | G06Q 10/10 |
| 10,904,325 | B2* | 1/2021 | Vysotsky | G06F 9/45529 |
| 11,271,805 | B2* | 3/2022 | Moyers | H04L 65/4053 |
| 2003/0225836 | A1 | 12/2003 | Lee et al. | |
| 2006/0023063 | A1 | 2/2006 | Okawa | |
| 2006/0277096 | A1* | 12/2006 | Levitus | G06Q 10/10 |
| | | | | 714/25 |
| 2014/0063174 | A1 | 3/2014 | Junuzovic et al. | |
| 2015/0033140 | A1* | 1/2015 | Kuchoor | G06F 3/1454 |
| | | | | 715/751 |
| 2015/0116367 | A1 | 4/2015 | Yada | |
| 2015/0149195 | A1* | 5/2015 | Rose | G16H 30/20 |
| | | | | 705/2 |
| 2016/0011845 | A1* | 1/2016 | Kuchoor | G06F 40/169 |
| | | | | 715/753 |
| 2019/0236547 | A1* | 8/2019 | Huang | H04L 65/4015 |

\* cited by examiner

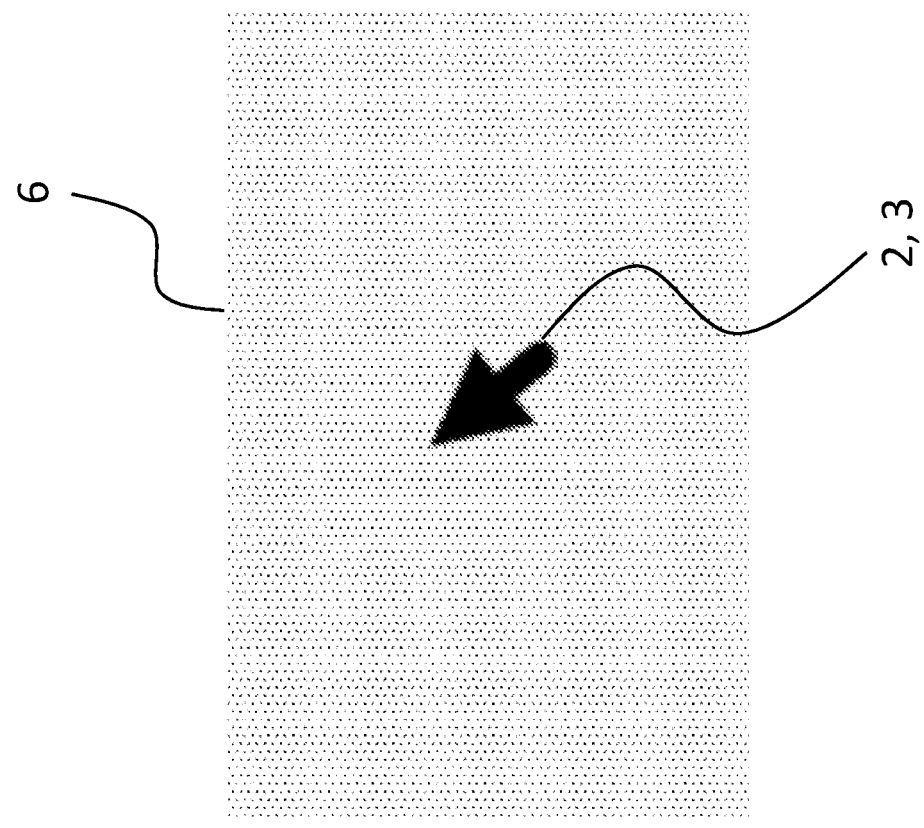
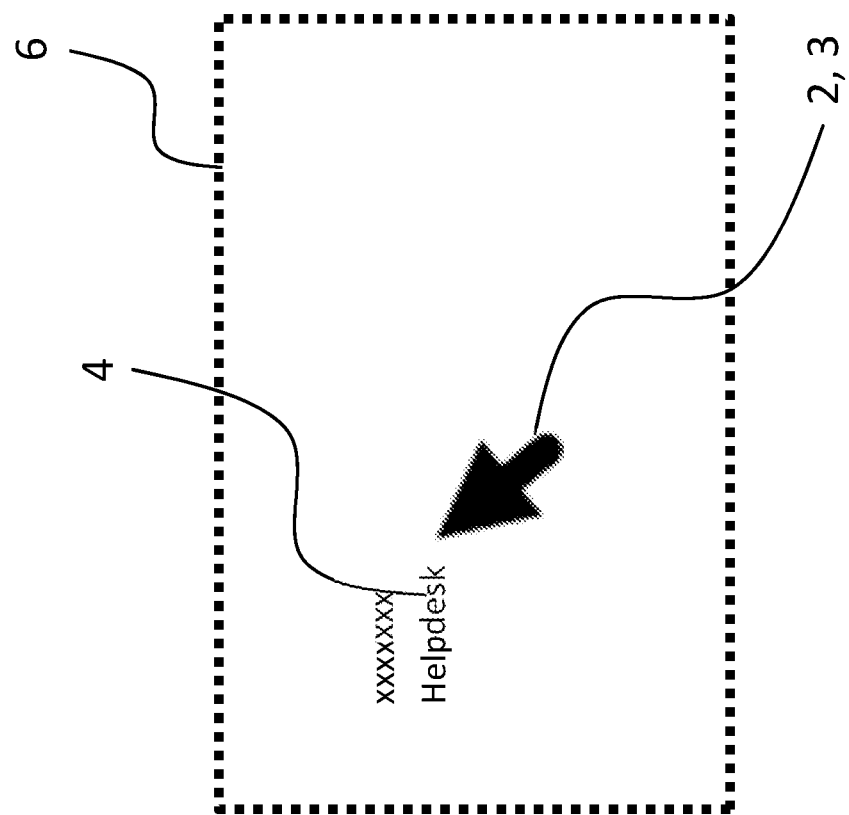
Fig. 5

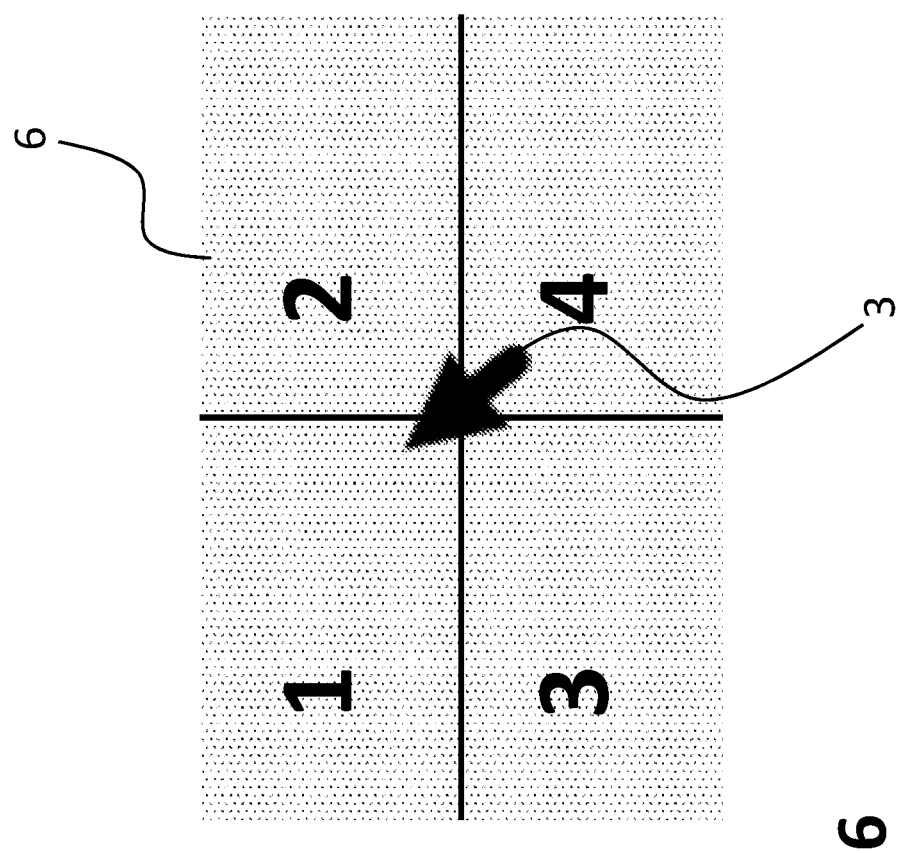
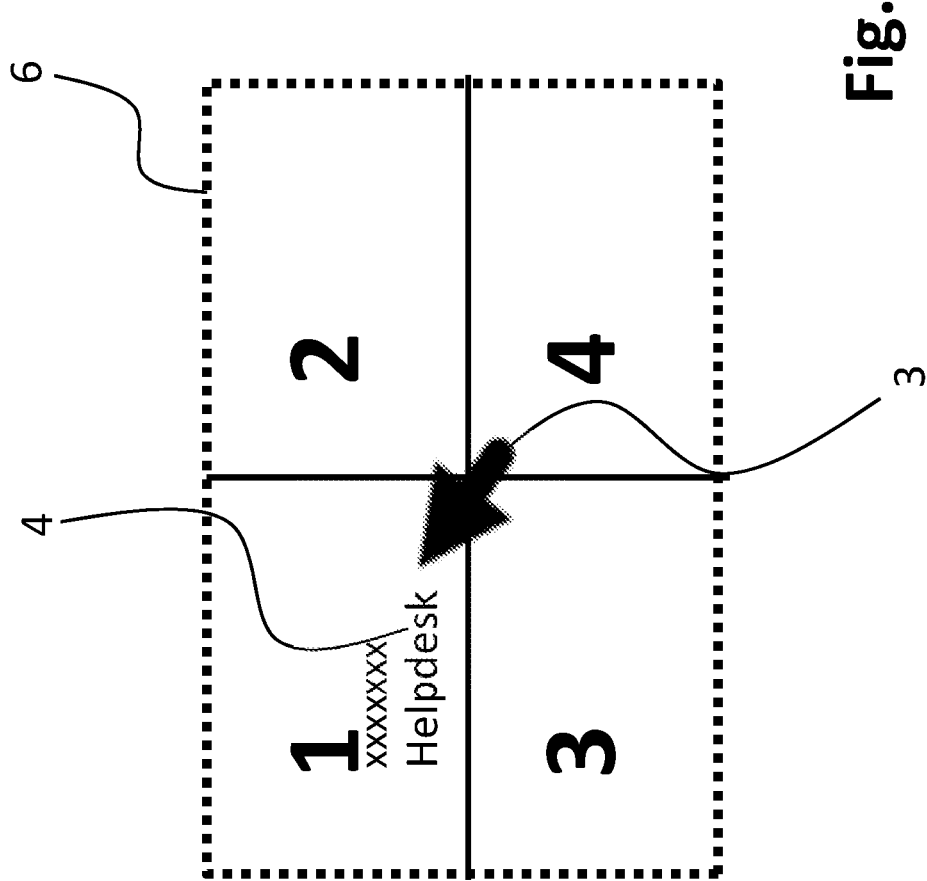
Fig. 6

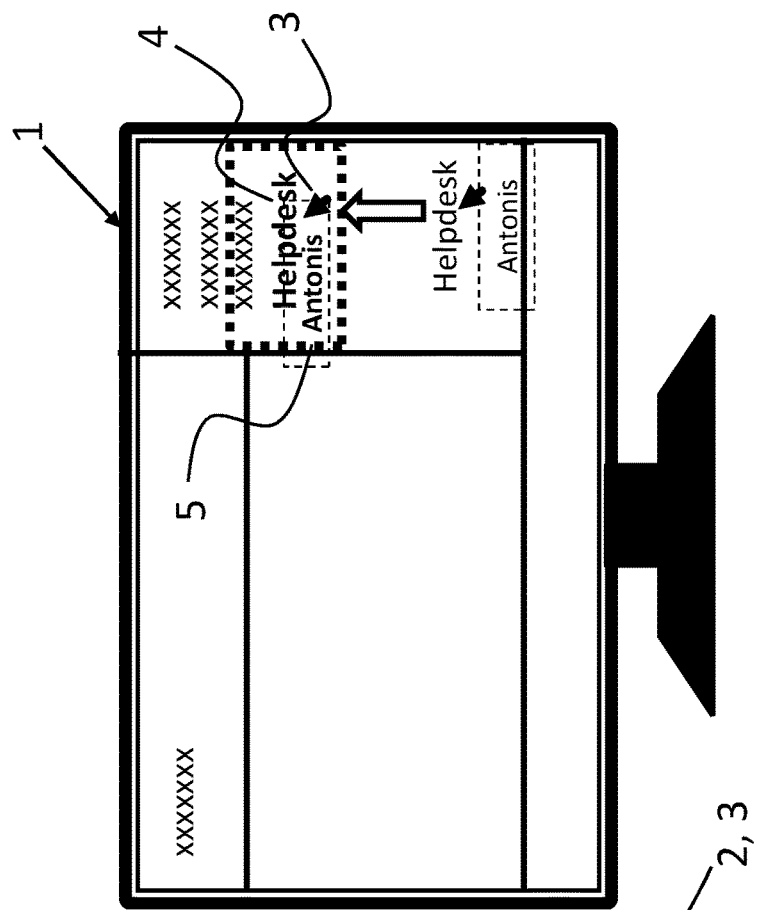
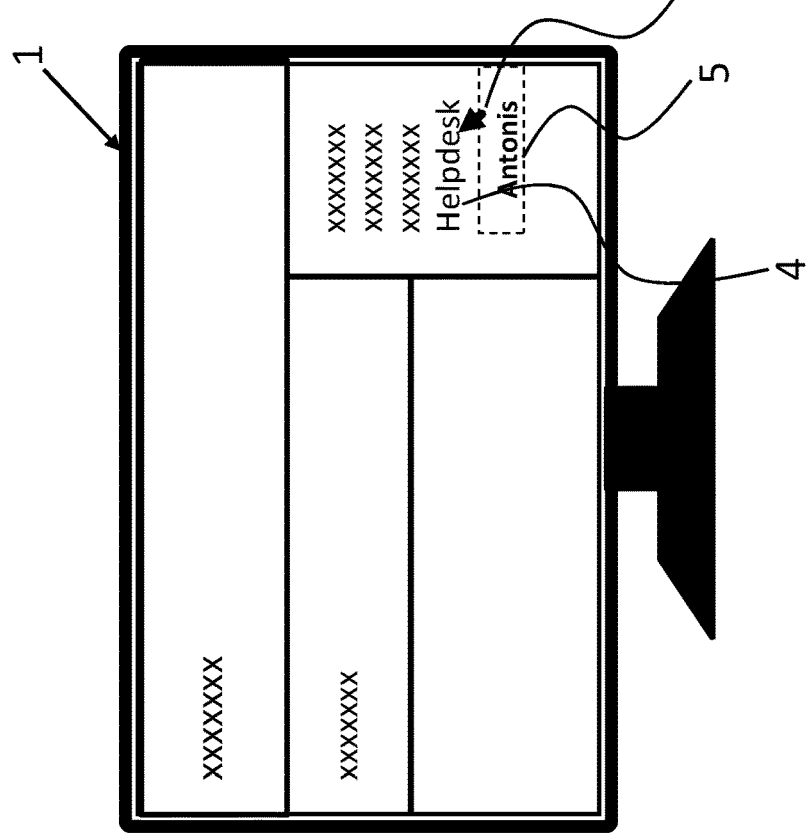
Fig. 9

COMPUTER-IMPLEMENTED METHOD OF SHARING A SCREEN, MEDIA SERVER, AND APPLICATION FOR CONTROLLING A REAL-TIME COMMUNICATION AND COLLABORATION SESSION

CROSS-REFERENCE TO RELATED APPLICATIONS

The present application claims priority to European Patent Application No.: EP 20 182 051.1 filed on Jun. 24, 2020. The entirety of this European Patent application is incorporated by reference herein.

FIELD

The present invention relates to a computer-implemented method of sharing a screen, a media server, and to an application for controlling a real-time communication and collaboration session.

BACKGROUND

Web collaboration and communication sessions today find widespread use as people that collaborate e.g. in teams or the like work in different locations or from home office. Moreover, in such web collaboration and communication sessions, many tools and features are known from prior art, for example, screen sharing. With respect to this feature, a participant may share his or her screen such that the other remotely located participants of the collaboration session are able to view relevant content displayed at the shared screen.

SUMMARY

I determined that, when watching the shared screen, one of the collaboration session's participants may want to point at a specific displayed item on the shared screen in order to comment on something shown there that is relevant for the ongoing discussion. As a user or participant thus points at an item displayed at the shared screen, it may happen that due to some delay in the communication connections between the participants, the shared screen has already been scrolled further up or down so that the coordinates of the position of the item pointed at on the screen no longer refers to the relevant or intended content.

Embodiments of the method, telecommunication apparatus, and communication device can be based on the object to provide a solution for the above described problem so that a pointing position always remains at the intended position or item on the screen, even if the latter has been moved by scrolling up or down or even from left to right.

Embodiments of a computer-implemented method of sharing a screen amongst at least two users participating in a real-time communication and collaboration session via a communication network is provided, wherein a screen comprising first content is shared by a user of a first client so as to be displayed at at least a second client used by a second user, wherein, as the shared first content is being displayed the at least one second client, the second user points at an intended item of the first content. The method can include:

receiving, at a control unit for controlling the communication and collaboration session, coordinates specifying the position of the intended item of the first content of the shared screen;

receiving, at the control unit, a screenshot of the intended item and a predetermined surrounding area as a sample picture or as sample pixels, the screenshot being taken at the point of time when the second user points at the intended item on the first content of the shared screen;

receiving, at the control unit, data relating to second content of the shared screen transmitted from the first client;

searching, by the control unit, the sample picture or sample pixels of the screenshot taken from the first content in the data relating to the second content, in particular, in the vicinity of the coordinates received; and indicating the intended item in the second content of the shared screen.

In embodiments of the method, the pointing position can always remain fixed to the intended position or item pointed at on the shared screed, regardless of the changes that might have been made to the shared screen, like scrolling the latter up or down and regardless of any occurrences of delay. This can be enabled due to transferring additional data to the device or server or application that will present the shared screen as well as the pointing position so as to enable this functionality.

According to a preferred embodiment of the invention, the step of indicating the intended item in the second content can be carried out upon finding the sample picture or the sample pixels in the second content of the shared screen. In response to finding the sample picture or sample pixels in the second content of the shared screen, matching the sample picture or sample pixels of the screenshot taken of the first content with the identical picture in the second content, so as to identify a matching content area can also be performed. The step of indicating the intended item in the second content can include displaying a pointer. The screenshot of the intended item and the predetermined surrounding area can have the same resolution as the received shared screen frame comprising the first content of the shared screen.

In embodiments of the method, the control unit may be an application run by a communication device (e.g. a server, a computer device, etc.), a media server or a control device that controls the screen sharing communication and collaboration session. The control device can be a machine that includes at least one processor connected to a non-transitory computer readable medium and at least one transceiver unit having at least one receive and at least one transmitter. The control device can include, for example, a media server, a server, or other type of computer device that includes hardware such a a processor, non-transitory memory, and at least one transceiver unit.

Preferably, the step of searching the sample picture from the first content of the shared screen can be carried out in a vertical direction above and below the coordinates received. The step of searching can be repeated every time new content is shared. It may also (or alternatively) occur at pre-selected or pre-defined time intervals. Such intervals can be prompted via new content being shared or some other pre-defined parameter or set of parameters.

According to yet another preferred embodiment of the invention, the change from the first content to the second content shared by the first user can be effected by scrolling the shared screen vertically (e.g. up or down) or sideways (e.g. from left to right or from right to left).

It is advantageous, if the method further comprises a step of subdividing the sample picture or sample pixels into a predetermined number of quadrants, in particular, into four quadrants or into another subset of quadrants (e.g. three quadrants, five quadrants, etc.). Preferably, the quadrants of the sample picture or sample pixels can be used for determining a matching of the content at the corners of the shared screen.

Further, according to the present invention, a media server is provided comprising a control unit for controlling a real-time communication and collaboration session via a communication network. The media server can be adapted to carry out the method of sharing a screen amongst at least two users participating in a real-time communication and collaboration session via a communication network. The at least two participants can each utilize a communication terminal to communicatively connect to the media server for participating in the real-time communication and collaboration session. for instance, each participant can use a telephone, a smart phone, a laptop computer, a personal computer, a tablet, or other type of terminal device.

Moreover, according to the present invention, a non-transitory computer readable medium having an application stored thereon for controlling a real-time communication and collaboration session via a communication network is provided which is adapted to carry out the method of sharing a screen amongst at least two users participating in a real-time communication and collaboration session via a communication network. Code of the application stored in the computer readable medium can define an embodiment of the method that can be executed by a communication device that runs the application (e.g. a media server, a communication device, a computer device, etc.).

Other details, objects, and advantages of the method, media server, computer device, telecommunications apparatus, system, device, and methods of making and using the same will become apparent as the following description of certain exemplary embodiments thereof proceeds.

BRIEF DESCRIPTION OF THE DRAWINGS

The invention and embodiments thereof will be described below in further detail in connection with the drawings. It should be understood that like reference characters used in the drawings may identify like components.

FIG. 5 schematically shows two examples of a screenshot of the shared screen shown in FIG. 4 according to an embodiment of the invention.

FIG. 6 schematically shows the two examples of a screenshot of FIG. 5 that have been subdivided according to an embodiment of the invention.

FIG. 9 schematically shows an exemplary process for how the pointing position is moved as the shared screen is moved from first content to second content according to an embodiment of the invention.

Figure 1:
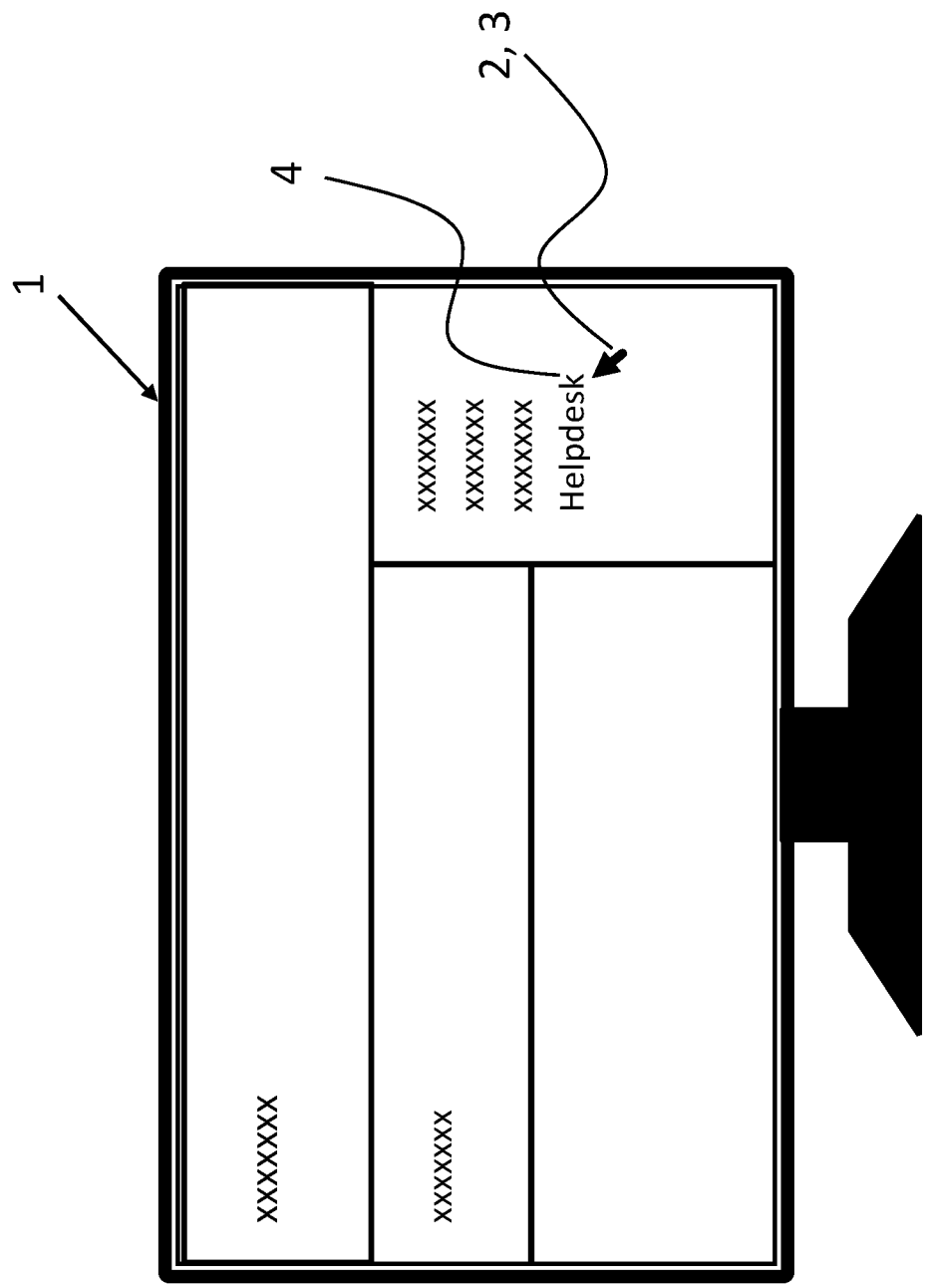
FIG. 1 schematically shows an exemplary embodiment of a shared screen with first content.

Reference numerals used in the drawings include:
1—Shared screen;
2—Pointing position;
3—Arrow;
4—Intended item;
5—Information on pointing user; and
6—Screenshot.

DETAILED DESCRIPTION

FIG. 1 schematically shows a shared screen 1 displaying first content. As can be seen here, an item of the first content, namely, the word "Helpdesk" has been indicated by an arrow 3, as for example, it is displayed on a screen when using a pointer device (e.g. a mouse pointer, stylus, or cursor). The arrow 3 is located at the intended position, which is referred to as pointing position 2, i.e., the position of the item that a user intends to indicate to other users.

The shared screen 1 is part of a collaboration session scenario in which a plurality of users or participants that are located remotely collaborate with each other via a communication network. Every user of the collaboration is equipped with a terminal or client comprising a display means (e.g. display, liquid crystal display, monitor, etc.). A user may share content that is relevant for the collaboration session that is displayed on his or her screen with the other users or participants. Any one of the other users or participants of that collaboration session who are thus able to view the shared content on their own respective display devices may then point to an item 4 of the content of the shared screen 1, here the first content, by using, for example, a mouse cursor or other type of pointer device as mentioned above.

Figure 2:
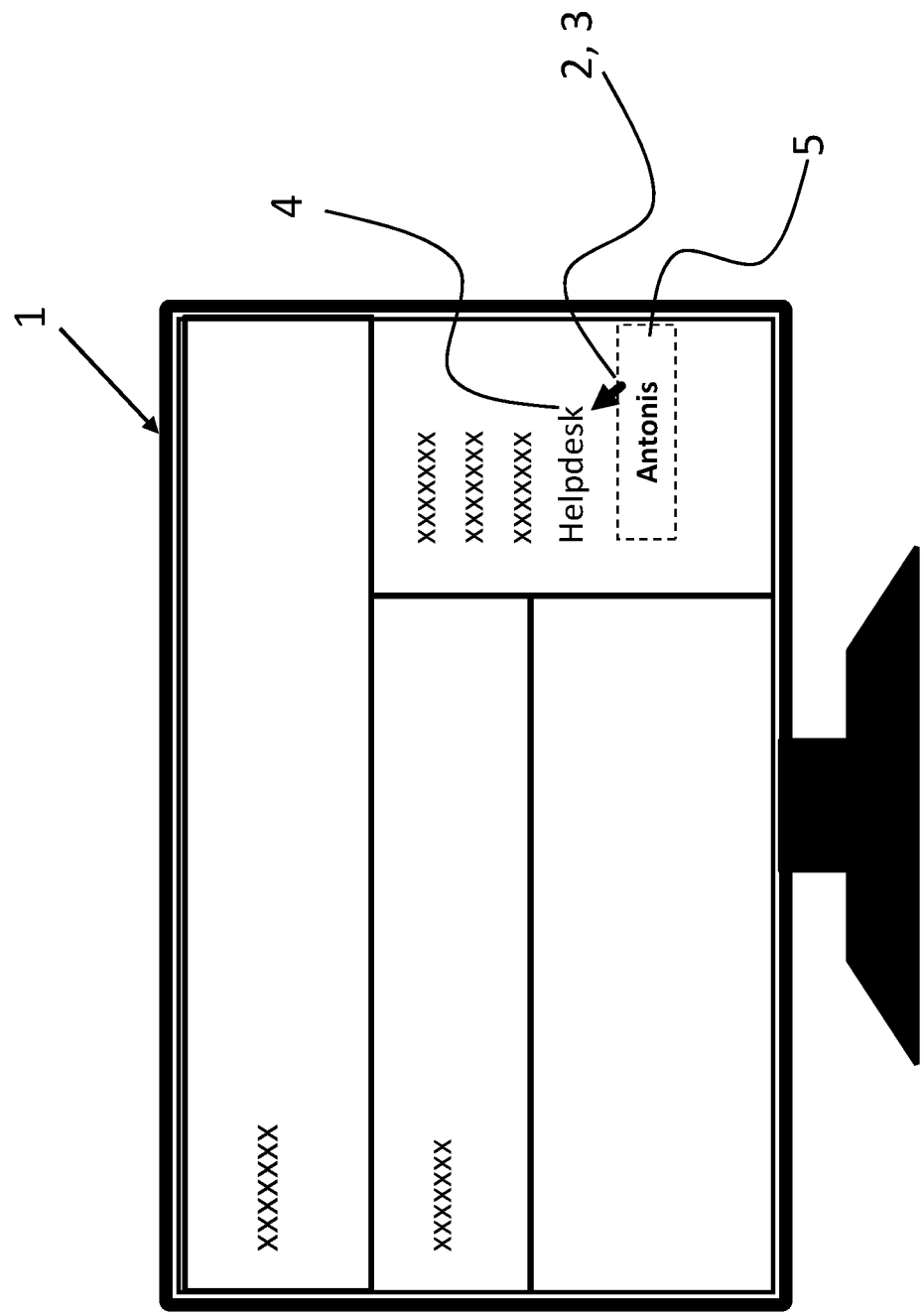
FIG. 2 schematically shows the exemplary shared screen of FIG. 1 which has not yet been moved.

FIG. 2 schematically shows the shared screen 1 of FIG. 1 which has not yet been moved and thus still shows the first content. According to another feature of the web collaboration and communication application that is used for this collaboration session, information 5 on the user who is pointing at the item 4 of the first content of the shared screen 1 is also provided to the other users by indicating the name (here, this is "Antonis" for this particular example) of that user.

Figure 3:
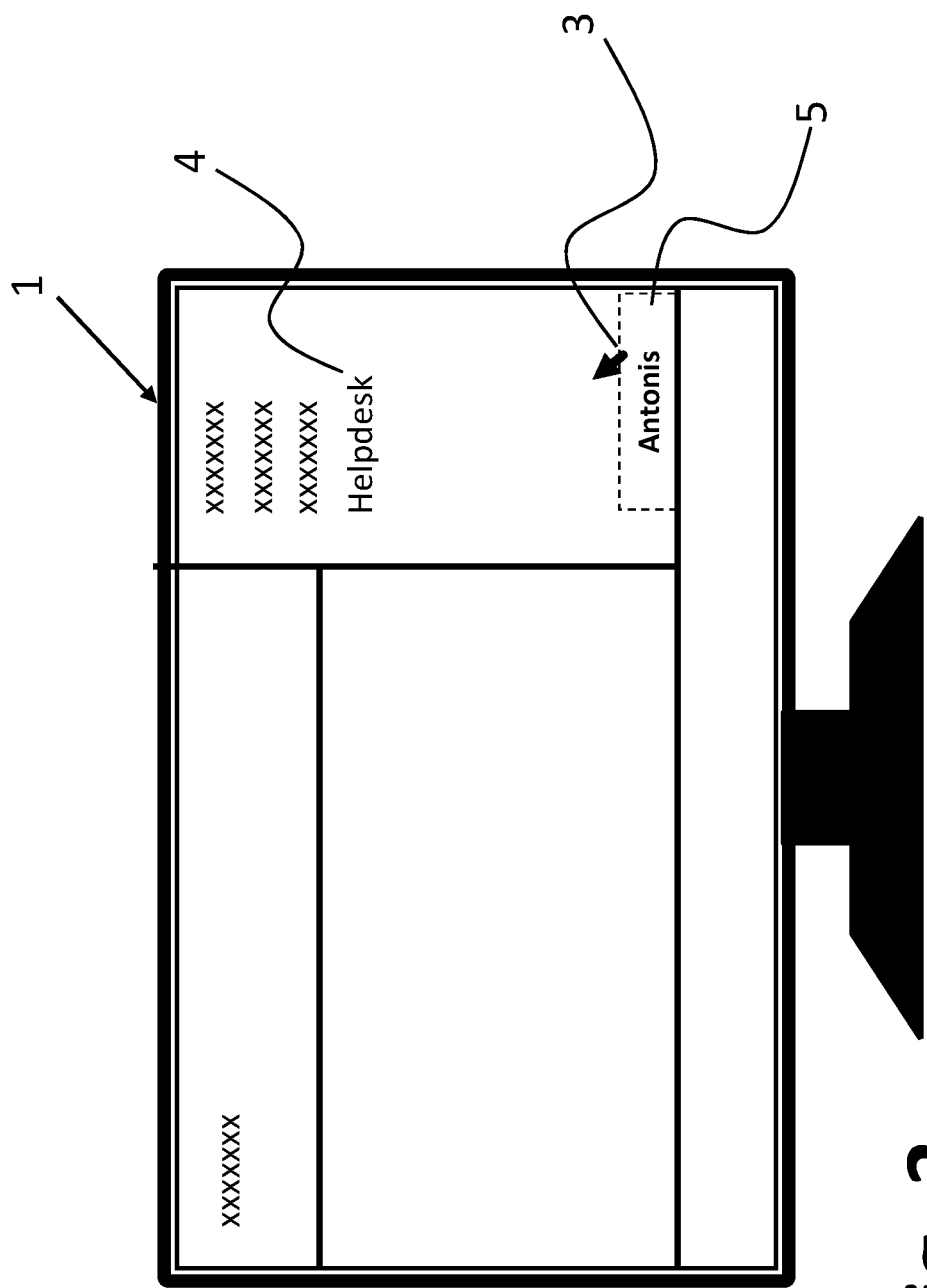
FIG. 3 schematically shows an exemplary embodiment of a shared screen with second content.

FIG. 3 schematically shows the shared screen 1, which however has been scrolled further down so as to now display second content.

In the scenario described above, when a user points at a position (pointing position 2) on the screen 1, then the coordinates of this position are sent to the application, server or device that handles the collaboration and communication session comprising the screen sharing, and the pointing position 2 appears on the screen 1 regardless of whether the screen has been scrolled up or down and thus has changed, or not. As can be seen here, as the shared screen 1 has been scrolled further down so as to now display second content, the pointing position 2 is still at the position referring to the intended item as shown in FIG. 1 and FIG. 2, but the intended item no longer is at this position so that a completely different item is indicated by the arrow 3. Therefore, presenting a pointing position 2 to other users only makes sense, if the content of the shared screen 1 remains unchanged and is not moved, for example, scrolled up or down or to the left or right.

Figure 4:
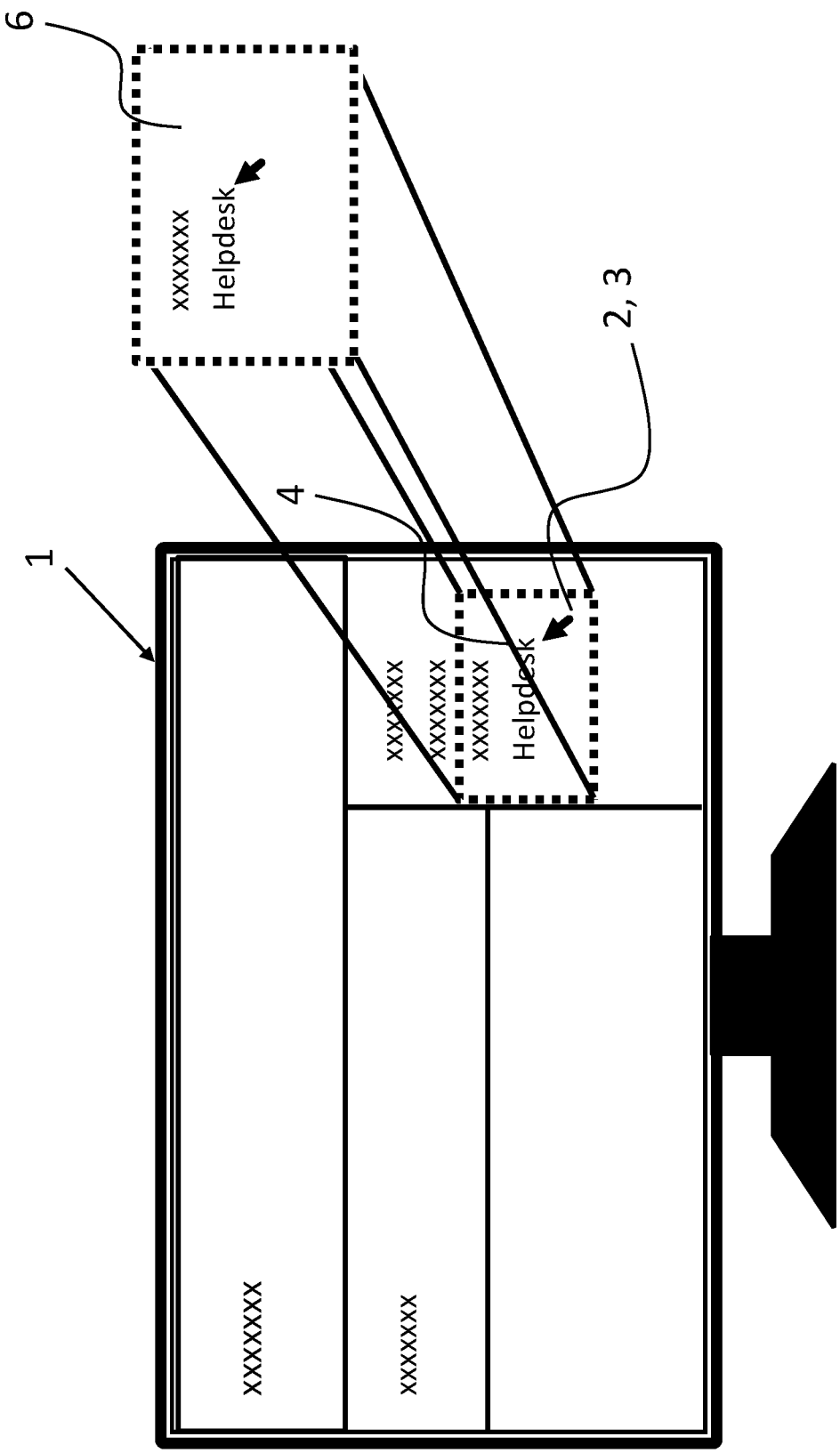
FIG. 4 schematically shows an exemplary embodiment of a shared screen according to an embodiment of the invention.

FIG. 4 schematically shows a shared screen 1 according to an embodiment of the invention. Again, a user of a web-based real-time communication and collaboration session has shared his or her screen 1 with other users participating in the session so as to display first content. However, according to the embodiment shown here, whenever a user is pointing at a position (pointing position 2) on the shared screen 1, apart from the coordinates, also a small screenshot 6 of a portion of the shared screen 1 comprising the intended item 4 is transferred to the application responsible for presenting the pointing position 2 (e.g. application run by a media server hosting the communication and collaboration session, an application run by a computer device hosting the communication and collaboration session, etc.). This screenshot 6 is taken exactly at the point of time when the user points to the intended item 4 on the shared screen 1. Also, the screenshot 6 according to the embodiment shown here has the same resolution as the shared screen frame received. As can be seen here, the screenshot 6 is only a small part or portion of the entire shared screen 1 so that the transmission time of this sample picture, namely, of the screenshot 6, is not significant.

It is noted that in order to keep the amount of data transferred for this purpose low, instead of transmitting a picture, also a sample of pixels around the pointed position 2 could be transferred. The picture around the intended item 4 and the pointing position 2 or the sample of pixels serve for identifying the pointed position 2 on the shared screen 1.

The following picture presents a sample image that could be transferred from the endpoint that triggers the pointed position. To make the description easier a sample picture will be used to describe the referenced pointed position although a sample of pixels could be used as well in order to transfer less data.

FIG. 5 schematically shows two examples of screenshot 6 of the shared screen 1 shown in FIG. 4 according to an embodiment of the invention. On the left hand side, the screenshot 6 comprises the pointing position 2 indicated by the arrow 3 together with a picture of the surrounding text according to the first content displayed on the shared screen 1, whereas on the right hand side, the screenshot 6 comprises the pointing position 2 indicated by the arrow 3 together with only a sample of pixels. The screenshot 6 comprising only a sample of pixels compared to the screenshot 6 comprising the entire picture of the content surrounding the intended item 4, when being transmitted to the control means or control unit handling the session, uses less transmission resources as it comprises less data to be transmitted.

When the screenshot 6 comprising the sample picture along with the coordinates of the pointed position 2 are received by the control unit of the application that handles the collaboration session comprising the screen sharing feature (e.g. a media server hosting the session running the application), then this sample is used to identify the pointed position 2 on a shared screen 1 that has been moved by being scrolled up or down so as to then display second content. The application will try to match the sample picture of the screenshot 6 (or the sample pixels accordingly) received with the image that is currently shared. If a match is found, then the pointing figure, here the arrow 3, is displayed in this area. This process is repeated for the duration of the pointing mark (arrow 3) appearance. This means that even if the screen sharing party moves the shared screen 1 in any direction, the marked pointing position 2 is moved accordingly since the matching of the received sample is repeated.

In case no match is found on the shared screen 1 comprising the second content, then the position coordinates that are also transmitted as described above are used. Again, the matching process is repeated and if a match is found while moving the shared screen 1, then the marked position is again moved to the matching position.

FIG. 6 schematically shows the two examples of a screenshot 6 of FIG. 5 that have been subdivided according to an embodiment of the invention. Namely, here, in order to identify also the shared position in the corners or sides of the shared screen 1, the samples received are divided in four quadrants, indicated by the numbers 1, 2, 3, 4. Each of these quadrants is checked at the corners and sides of the shared screen 1 in order to identify matches in those areas.

Figure 7:
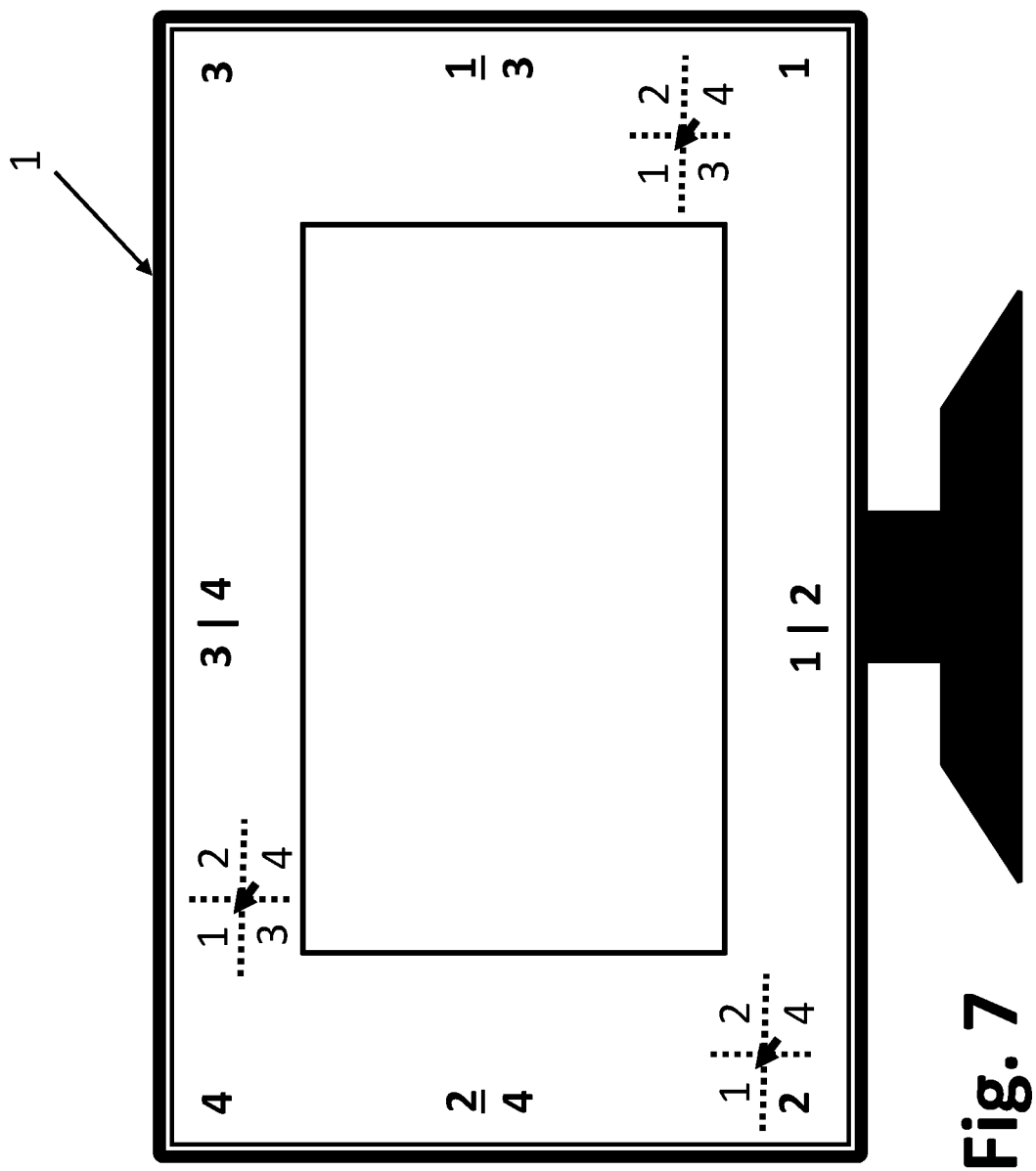
FIG. 7 schematically shows areas on the exemplary shared screen applying the subdivisions of the screenshot shown in FIG. 6.

FIG. 7 schematically shows areas on the shared screen 1 applying to the subdivisions of the screenshot shown in FIG. 6. Due to these subdivisions according to the quadrants shown in FIG. 6, it is possible to match the screenshot 6 with the second content of the shared screen 1, even if only a portion of the screenshot 6, as for example, only the quadrant 4 or 3, is still being displayed and visible in the second content of the shared screen 1. Here, a matching procedure referring to the sides of the shared screen 1 is carried out. For example, the user who shares the screen may scroll in any direction of the screen and a case may appear that the sample sent from the screen-sharing user may not be matching with the pointing position at least partially. This means that by scrolling down, the pointed position could be moved up at the screen so that part of the quadrants 1 and 2 of FIG. 6 are moved partially or fully out of the screen. This will mean that the sample will not match completely with any part of the screen 1 displayed. But still, it may be possible that the pointed position is displayed. At the upper part of the screen 1, as this is defined by the external part of the screen 1 in regards to the rectangle at the center of the screen in FIG. 7, if quadrants 3 and 4 are matching, then the latter are sufficient to present the pointed position. The same applies respectively for the lower part of the screen 1, the right part of the screen and the left one.

Figure 8:
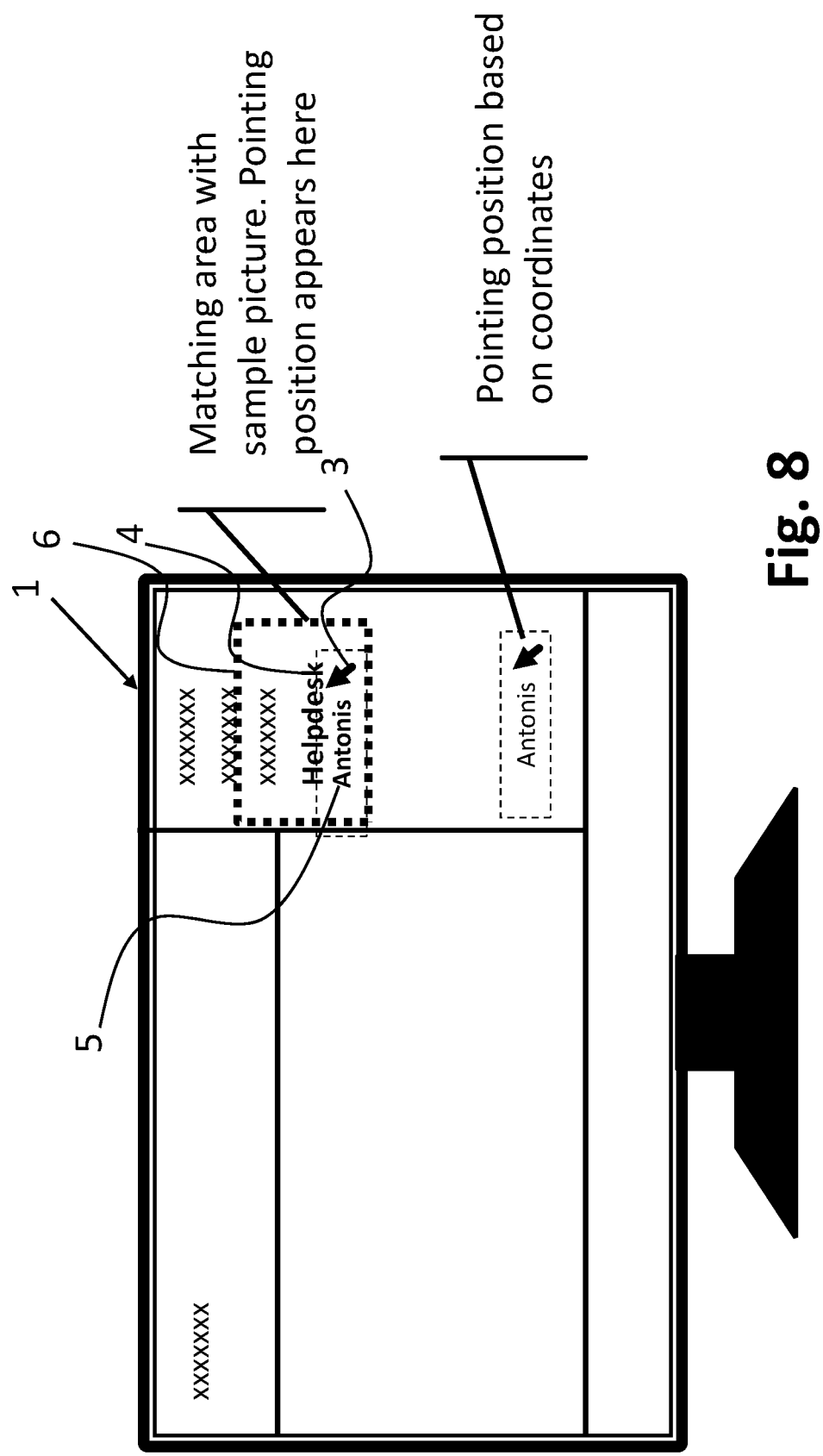
FIG. 8 schematically shows an exemplary process by which a pointing position indicated in first content of a shared screen is displayed in second content of the shared screen according to an embodiment of the invention.

FIG. 8 schematically shows how a pointing position 2 indicated in first content of a shared screen 1 is displayed in second content of the shared screen 1 according to an embodiment of the invention. As already described above, a user might indicate an item (intended item 4) on first content of a shared screen 1, but as the screen sharing user scrolls the shared screen 1 further up or down, the intended item 4 will be moved to another position on the shared screen 1.

Here, when the screenshot 6 comprising the sample picture along with the coordinates of the pointed position 2 are received by the application that handles the screen sharing session, then this sample is used to identify the pointed position 2. The application will try to match the sample picture comprised in the screenshot 6 taken from the first content of the shared screen 1 with the image (second content of shared screen) that is currently shared. If a match is found, then the pointing mark, here the arrow 3, will appears in this area. This process is repeated for the duration of the pointing mark appearance. This means that even if the screen sharing party moves the shared screen 1 in any direction, the marked position will be moved accordingly since the matching of the received sample is repeated.

In case no match is found on the second content of the shared screen 1, then the received coordinates are used. But again, the matching process is repeated and if a match is found while moving the shared screen then the marked position is again moved to the matching position. In order to also identify the shared position in the corners or sides of the shared screen 1, the samples received are divided in four quadrants as described with respect to FIG. 6 and FIG. 7.

FIG. 9 schematically shows how the pointing position 2 is moved as the shared screen 1 is moved from first content to second content according to an embodiment of the invention. Namely, on the left hand side, the shared screen 1 is shown displaying first content with the arrow 3 indicating an intended item 4. Also, the name "Antonis" of the user pointing at the intended item 4 is displayed. On the right hand side, the shared screen 1 has been moved so as to now display second content.

However, the intended item 4 that now has been moved further up on the shared screen 1 is indicated correctly by the arrow 3 that has been also moved to the correct position (pointing position 2) in the second content together with the name "Antonis".

Figure 10:
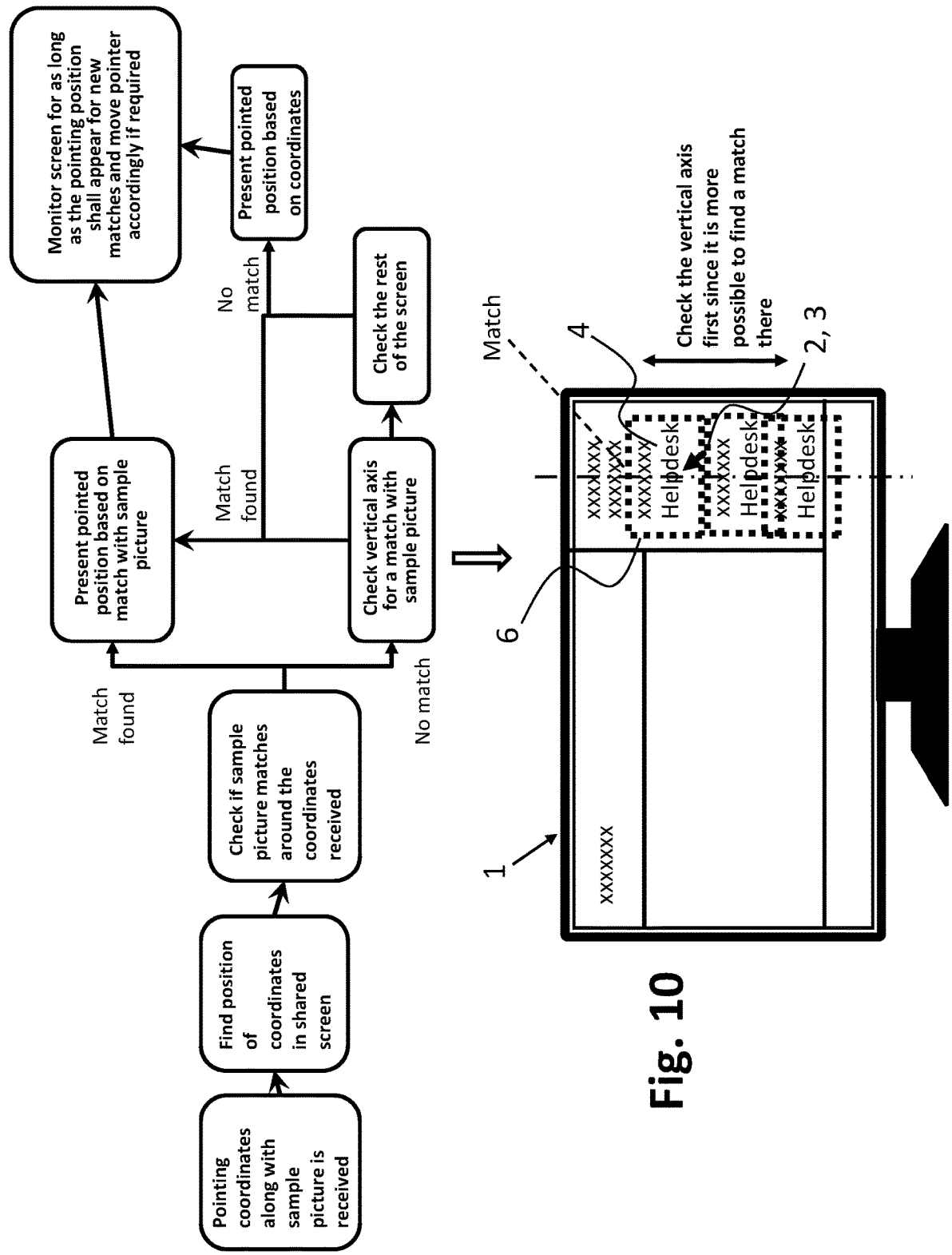
FIG. 10 schematically shows an exemplary procedure for a matching process according to an embodiment of the invention.

FIG. 10 schematically shows an exemplary procedure for a matching process according to an embodiment of the invention. As already noted above, a control unit (e.g. processor running an application, a media server or other device that controls the screen sharing session) receives the coordinates of the pointed position 2 along with the picture sample comprised in the screenshot 6, then determines and finds the position of the coordinates and checks if this position matches with the picture sample as well. Since possibly the user has not changed the screen this position is checked first. If it matches, then the pointer is presented. If not, then first the vertical axis is checked, because in such sessions the scrolling up or down could be the most probable screen movement. If no match is found, again then the full screen is checked. If a match is found, then the pointer appears at the relevant position. If not, the coordinates received are used to present the pointing position 2. Otherwise, depending on the implementation, no pointer may appear as it might no longer make sense to point at content that is not present on the shared screen any more. After this process is completed, the web collaboration tool keeps checking the shared screen 1 in order to update the pointing position 2 in case the shared screen 1 changes, or in case a matching position appears. This process is active as long as the pointing position 2 appears on the shared screen 1. It is noted that in case two or more positions are matching with the sample picture, then again the received coordinates could be used to present the pointer (arrow 3). However, this would be a very rare case or even a mistake, since possibly such a pointing will not have much value in a conversation.

The last requirement is where the pointer (e.g., the arrow 3) shall appear if a matching position between the sample picture (screenshot 6) and the second content of the shared screen is found. If the sample picture fully matches at a position in the second content of the shared screen, then the pointer (arrow 3) appears in the center of this matching area. If one of the quadrants (see FIG. 6) matches at a position in the shared screen 1, then the pointer appears in the relevant corner of the quadrant that corresponds to the center of the sample picture. This corner is easily identifiable in FIG. 6.

It is noted that the above described functionality is intended for any collaboration tool that includes screen sharing and the users have the capability to point at a position of content of the shared screen. This way the pointing position remains always relevant to the intended item of the user when he or she pointed on the screen and regardless of the delays imposed and any actions of the user that shares the screen.

It should be appreciated that the sample picture or pixels provided to the control unit can be transmitted by a user to the control unit via the user's communication terminal used to utilize the screen sharing functionality (e.g. smart phone or laptop computer having a display and a pointer device, etc.). The control unit can receive data from the user device, process that data, and provide output data to other users' devices as well as the user's device for facilitating the screen sharing feature as discussed herein. Such communication can utilize one or more network connections (e.g. internet connection, large area network connection, local area network connection, etc.) or other type of telecommunication connections. Different communication nodes can be utilized to facilitate the communication connections (e.g. base stations, access points, gateways, etc.).

It should be appreciated that different embodiments of the method, system, and apparatus can be developed to meet different sets of design criteria. For example, the particular type matching procedure that is used can be selected to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, terminal device, a system, and methods of making and using the same have been shown and described above, it is to be distinctly understood that the invention is not limited thereto but may be otherwise variously embodied and practiced within the scope of the following claims.

What is claimed is:

1. A computer-implemented method of sharing a screen amongst at least two users participating in a real-time communication and collaboration session via a communication network, wherein a screen comprising first content is shared by a user of a first client so as to be displayed at at least a second client used by a second user, wherein, as the shared first content is being displayed the at least one second client, the second user points at an intended item of the first content, the method comprising:
   receiving, at a control unit for controlling the communication and collaboration session, coordinates specifying the position of the intended item of the first content of the shared screen;
   receiving, at the control unit, a screenshot of the intended item and a predetermined surrounding area as a sample picture or as sample pixels, the screenshot being taken at the point of time when the second user points at the intended item on the first content of the shared screen;
   receiving, at the control unit, data relating to second content of the shared screen transmitted from the first client;
   searching, by the control unit, the sample picture or sample pixels of the screenshot taken from the first content in the data relating to the second content; and
   indicating the intended item in the second content of the shared screen.

2. The method of claim 1, wherein the indicating the intended item in the second content is carried out in response to finding the sample picture or the sample pixels in the second content of the shared screen.

3. The method of claim 2, comprising:
   in response to finding the sample picture or sample pixels in the second content of the shared screen, matching the sample picture or sample pixels of the screenshot taken of the first content with the identical picture in the second content, so as to identify a matching content area.

4. The method of claim 3, wherein the indicating further comprises displaying a pointer in a middle of the matching content area.

5. The method of claim 4, wherein the indicating the intended item in the second content comprises displaying the pointer.

6. The method of claim 1, wherein the screenshot of the intended item and the predetermined surrounding area has a same resolution as the received shared screen frame comprising the first content of the shared screen.

7. The method of claim 1, wherein the control unit is an application stored on a non-transitory computer readable medium that is executable by a processor of a communication device, a media server or a control device that controls the screen sharing communication and collaboration session.

8. The method of claim 1, wherein the searching for the sample picture from the first content is carried out in a vertical direction above and below the coordinates received.

9. The method of claim 1, wherein the searching is repeated every time new content is shared.

10. The method of claim 1, wherein a change from the first content to the second content shared by the first user is effected by scrolling the shared screen up or down.

11. The method of claim 1, comprising:
subdividing the screenshot comprising the sample picture or sample pixels into a predetermined number of quadrants.

12. The method according to claim 11, wherein the quadrants of the sample picture or sample pixels are used for determining a matching of the first and second content at corners of the shared screen.

13. A media server comprising:
a control unit for controlling a real-time communication and collaboration session via a communication network, wherein the media server is adapted to carry out the method of claim 1.

14. A non-transitory computer readable medium having an application for controlling a real-time communication and collaboration session via a communication network stored thereon, the application defining a method that is performed when a processor of a communication device runs the application, the method comprising:

in response to receiving coordinates specifying a position of an intended item of a first content of a shared screen and a screenshot of the intended item and a predetermined surrounding area as a sample picture or as sample pixels, the screenshot being taken at a point of time when user points at the intended item on the first content of the shared screen as well as data relating to second content of the shared screen, searching the sample picture or sample pixels of the screenshot taken from the first content in the data relating to the second content; and indicating the intended item in the second content of the shared screen.

15. The non-transitory computer readable medium of claim 14, wherein the method also comprises:

in response to finding the sample picture or sample pixels in the second content of the shared screen, matching the sample picture or sample pixels of the screenshot taken of the first content with the identical picture in the second content, so as to identify a matching content area for the indicating of the intended item in the second content of the shared screen.

* * * * *